United States Patent [19]
Carmichael et al.

[11] 3,756,409
[45] Sept. 4, 1973

[54] WATER DISPOSAL CAISSON AND METHOD OF USING SAME

[76] Inventors: Charles J. Carmichael, Harvey; Albert G. Franklin, New Orleans, both of La.

[22] Filed: Aug. 6, 1971

[21] Appl. No.: 169,677

[52] U.S. Cl. .................. 210/104, 210/109, 210/170
[51] Int. Cl. ........................................... B01d 21/24
[58] Field of Search ..................... 210/83, 84, 104, 210/109, 170, 242

[56] References Cited
UNITED STATES PATENTS
1,462,748   7/1923   Jones .............................. 210/109 X
3,425,556   2/1969   Volker ............................. 210/104
3,638,796   2/1972   Tuggle et al. ....................... 210/170
1,107,391   8/1914   Welch ............................. 210/242

*Primary Examiner*—John Adee
*Attorney*—Robert Theibault et al.

[57] ABSTRACT

The present disclosure is directed to a waste water disposal caisson for removing the oil from the waste water prior to discharging the waste water from an offshore oil drilling platform and comprises a main caisson having an oil collecting tube within the caisson which tube has an oil spillover opening proximate its top, a waste water introduction tube for introducing the waste water below the oil-water interface within the caisson and a pumping control means for pumping the oil from the oil collecting tube as it approaches the tubes capacity.

6 Claims, 11 Drawing Figures

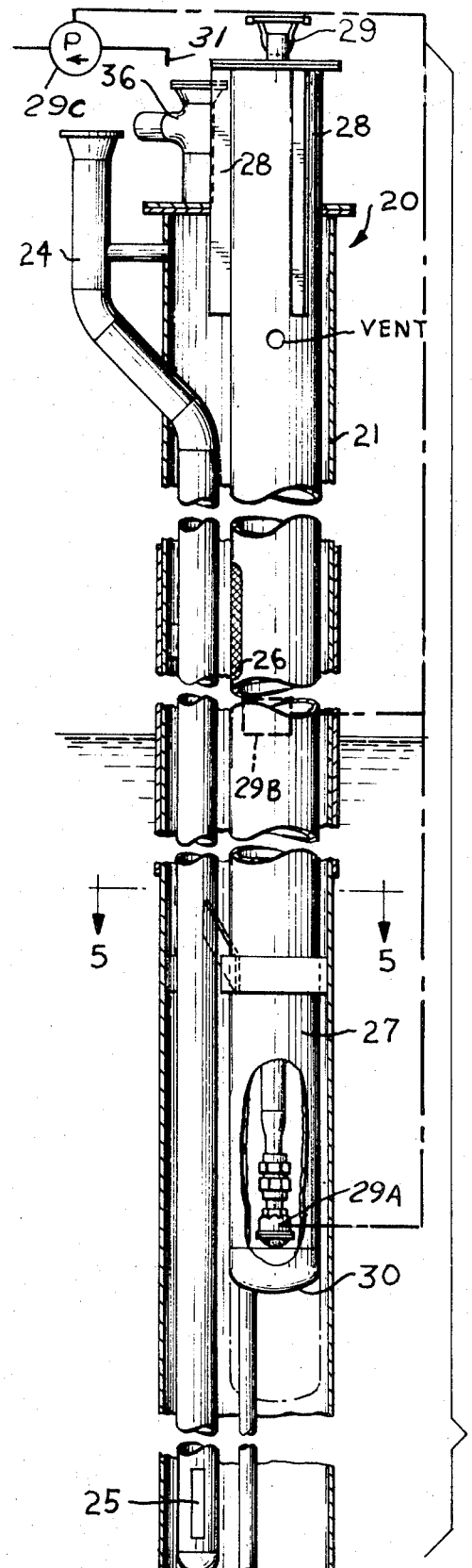
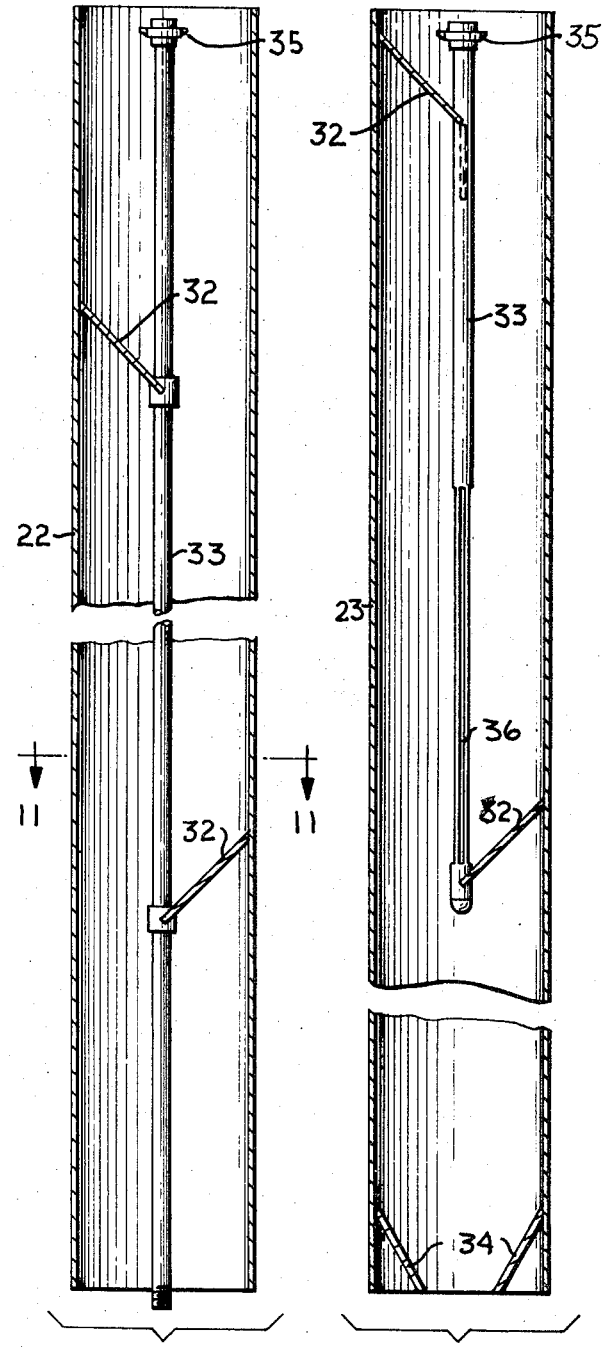
FIG. 1
FIG. 2
FIG. 3
INVENTOR
CHARLES J. CARMICHAEL
ALBERT G. FRANKLIN INVENTOR
CHARLES J. CARMICHAEL
ALBERT G. FRANKLIN
BY Wilkinson Mawhinney & Thiebault
ATTORNEYS

INVENTOR
CHARLES J. CARMICHAEL
ALBERT G. FRANKLIN

WATER DISPOSAL CAISSON AND METHOD OF USING SAME

An object of the present invention is to provide a water disposal caisson to serve as a final trap of free oil in the water prior to waste water being released overboard of an oil rig. The primary source of waste water to be put through the disposal caisson is water collected from the decks of offshore platforms, drip pans under certain types of equipment and water produced with the production of gas and oil.

A further object of the present invention is the provision of a waste water disposal caisson having an oil collecting chamber with an oil spill opening in its side wall to receive oil which floats up within the caisson after being introduced below the water interface and to provide means for pumping off the separated oil as it accumulates within the oil collecting chamber.

With the foregoing and other objects in view, the invention will be more fully described hereinafter, and will be more particularly pointed out in the claims appended hereto.

In the drawings like symbols refer to like or corresponding parts throughout the several views.

FIG. 1 is a side elevational view of the upper section of a waste water caisson with parts broken away and parts shown in section, in accordance with the present invention.

FIG. 2 is a side elevational view of the intermediate section of the waste water caisson of FIG. 1 with parts broken away and parts shown in section.

FIG. 3 is a side elevational view of the bottom section of the waste water caisson of FIG. 1 with parts broken away and parts shown in section.

Figure 4:
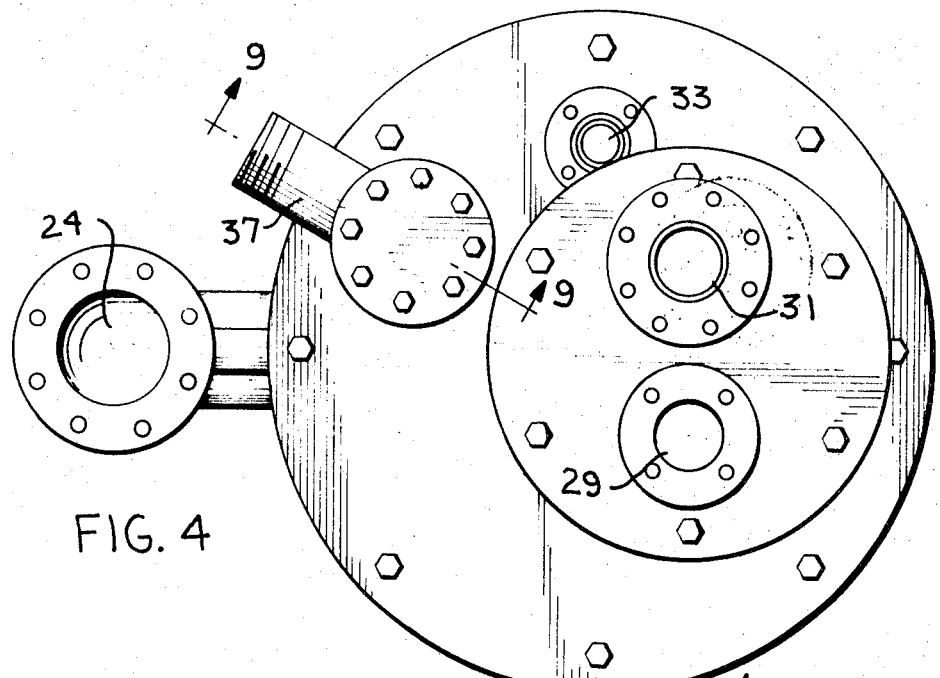
FIG. 4 is a top plan view of the caisson of FIG. 1.
Figure 5:
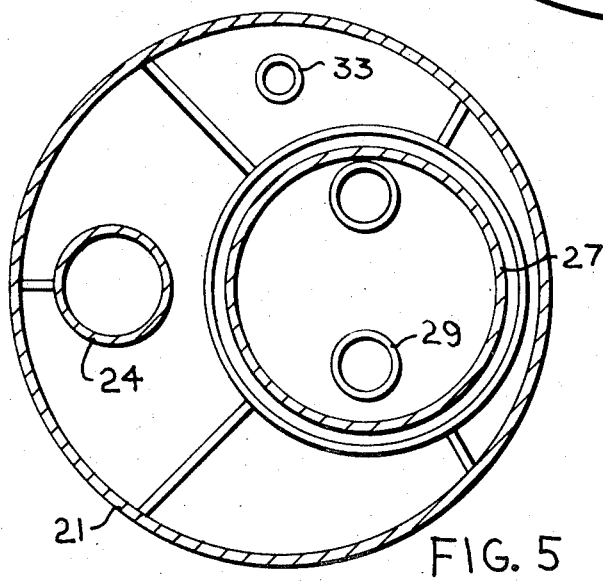
FIG. 5 is a transverse section taken on the lines 5—5 in FIG. 1 at a magnified scale.
Figure 7:
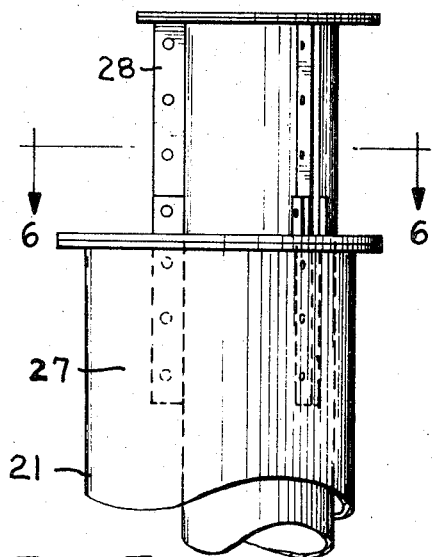
FIG. 7 is a fragmentary side elevational view of the upper portion of tbe oil collecting tube and its lifting lugs or perforated straps.
Figure 6:
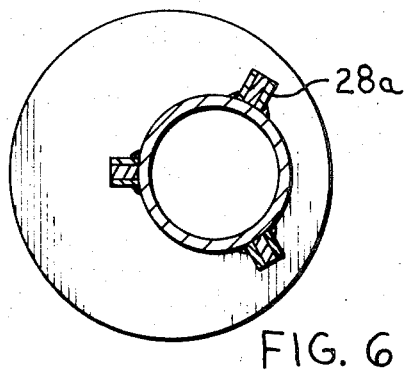
FIG. 6 is a transverse section taken on the line 6—6 in FIG. 7.
Figure 8:
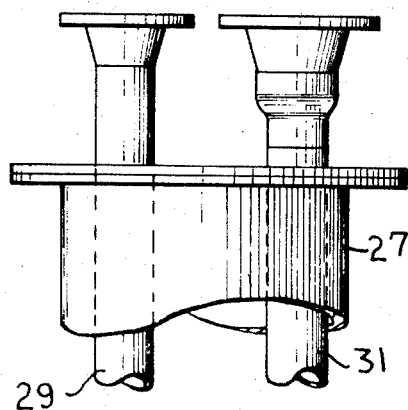
FIG. 8 is a side elevational view of the probe and suction introduced into the top of the oil collecting tube.
Figure 9:
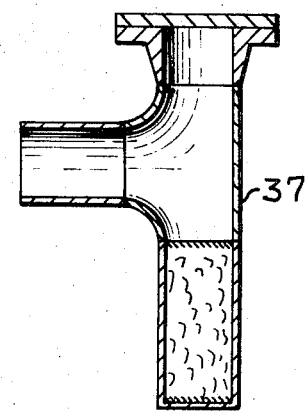
FIG. 9 is a vertical section taken on the line 9—9 in FIG. 4 showing the caisson vent.
Figure 10:
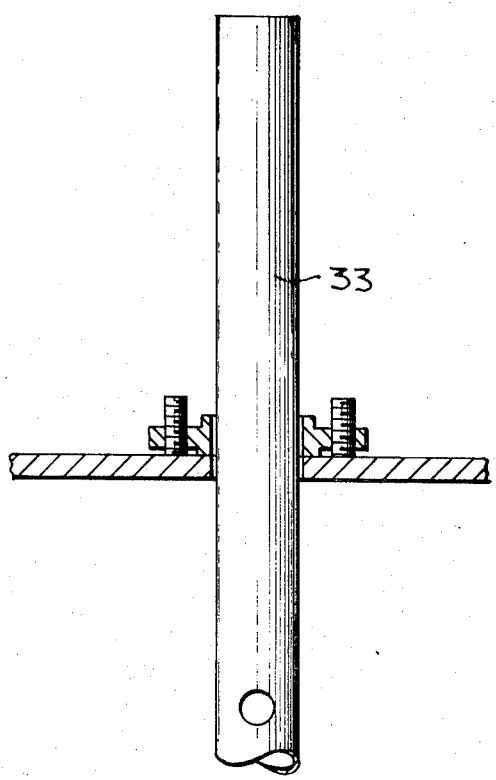
FIG. 10 is a side elevational view at an enlarged scale with parts broken away showing the sampler mounting in the top of the caisson.
Figure 11:
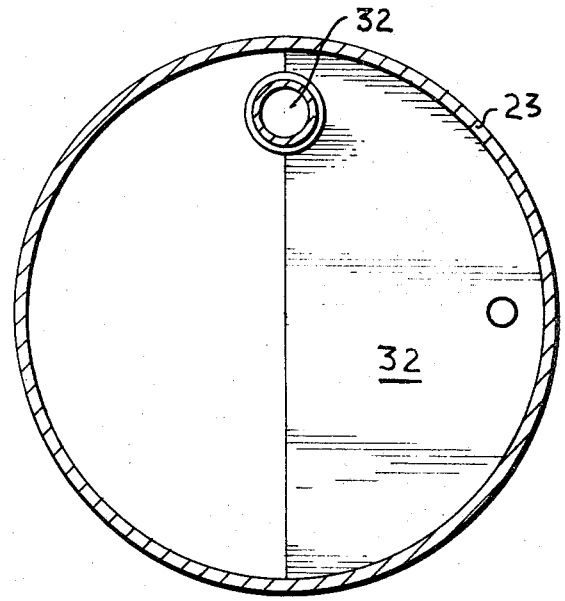
FIG. 11 is a transverse section taken on the line 11—11 in FIG. 3.

Referring now to the drawings, the disposal caisson 20 is made up of three sections, top 21, intermediate 22, and bottom 23. A complete caisson must necessarily consist of at least a top 21 and a bottom section 23 and the intermediate section 22 is used to obtain the required length of the overall caisson 20 to fit into the customer's offshore platform. Also, the diameter and length of the caisson 20 are sized to meet certain throughput velocities and retention time. As illustrated a unit consisting of one of each section, the following is a description of its construction and operation:

The waste water collected from the platform deck or drip pans enters the caisson 20 through line 24 and is released into the caisson at a point below the oil-water interface. Line 24 is slotted at 25 to disperse the downward flow energy of the inlet stream. The free oil separates from the water and rises in the caisson 20 to the elevation of the bottom of spill opening 26 where it spills over into the oil collecting tube or chamber 27. The height of opening 26 above mean low water is adjusted by using the lugs 28. The height of opening 26 above mean low water is established by the gravity of the oil collected and the depth of water in which the offshore platform is installed. The capacity of the oil collecting tube 27 varies according to the customer's desire, but is generally about three to four barrels. A pump switch of the customer's choice is installed on a pump float switch probe 29 and is operated by floatation signal means which comprise two floats, one 29A near the bottom 30 and the other 29B approximately 1 foot below the spill over opening 26. Both floats must be hanging or floating to actuate the pump switch. Upon a high level of oil in tube 27 the pump 29C is actuated, and the oil collected in the collection chamber or tube 27 is pumped from the caisson through a pump suction line 31; and when the low level is reached, the pump is shut down until the collection chamber 27 is refilled. The waste water after dispersement through slots 25 flows down through the caisson and, dependent upon the size, length, and volume, throughput is retained within the confines of the caisson for some period of time. This allows the smaller free oil particles to separate from the water. Also, any sand in the water stream as it falls through the caisson is cascaded or rolled by baffle plates 32 providing a washing action on the sand and assisting in releasing trapped oil. The baffles 32 serve several purposes, such as setting up a cascade type flow or turbulent flow, support for a sample line 33, and also a choke for upward flow resulting from wave action of the water body. Baffle plates 34 function primarily as a choke against the upward flow from wave action. According to rules and regulations of U.S.G.S., waste water must be sampled before it can be disposed into navagible water. The sample line 33 extends to within 5 to 10 feet of bottom of the caisson and is connected by couplings 35 through which samples of the waste water are taken by means of a thief. The last section of the sample line 33 has slots 36 to permit sampling. The caisson is provided with vents 37 to prevent pressure buildups in certain portions of the caisson that could cause it to malfunction.

The caisson 20 is designed on the principle of Stokes law of the separation of two or more substances having different specific gravities. The outside tubular shell of the caisson 20 may be built of varying diameters generally 24, 30 or 36 inches and may be of varying length from 50 feet to several hundred feet.

The oil collection tube or chamber 27 (sometimes referred to as quiet chamber) may also be of varying diameters and lengths, dependent upon the capacity of oil collection required before being pumped back into the offshore oil production system.

What we claim is:

1. An offshore water disposal caisson for separating oil from waste water comprising
   a. an outer caisson having an open bottom for communicating with the body of water in which the caisson is immersed below the surface thereof
   b. an oil collection tube having a closed bottom and a side wall oil filling opening through which oil is introduced proximate its upper end, said tube being of a diameter less than the diameter of said outer caisson and being within same c. means carried by said caisson within same and externally of said oil collection tube for introducing the oil containing waste water below the oil-water interface d. means connected between said oil collection tube and said outer caisson for raising and lowering said tube to position the oil filling opening through the side wall of said tube above mean low water level of the water body in which the caisson is immersed, e. and pumping means connected to said oil collection tube and having floatation signal means therein to actuate same when the oil level in said collection tube approaches the bottom of the oil filling opening in the side wall of said tube to remove the collected and separated oil therefrom.

2. An offshore water disposal caisson as claimed in claim 1 wherein the means for raising and lowering the oil collection tube relative to the caisson comprise perforate straps connected to the tube which are removably bolted to an anchor lug carried by the top of said caisson.

3. An offshore water disposal caisson as claimed in claim 1 wherein the floatation signal means of said pumping means disposed within the oil collection tube which initiates the pumping action to remove the oil from the tube when its level approaches the opening through the side wall are two float switches one of which is proximate the bottom of the tube and the other of which is proximate the bottom of the side wall opening and both of which must be floating to actuate pumping of the collected oil from said tube.

4. An offshore water disposal caisson as claimed in claim 1 further comprising staggered baffle plates disposed angularly within the caisson beneath the means for introducing the waste water and said oil collection tube to provide a washing action on entrapped sand to provide a washing action on the sand and to assist in releasing trapped oil.

5. An offshore water disposal caisson as claimed in claim 1 further comprising a sample line within the caisson external of said oil collection tube and extending to proximate the base of the caisson to test water being discharged from the caisson.

6. An offshore water disposal caisson as claimed in claim 1 wherein said means for introducing the oil containing waste water is a tube having vertically slotted openings for discharging the waste water raidially of the tube into the water within the caisson.

* * * * *